No. 777,257.

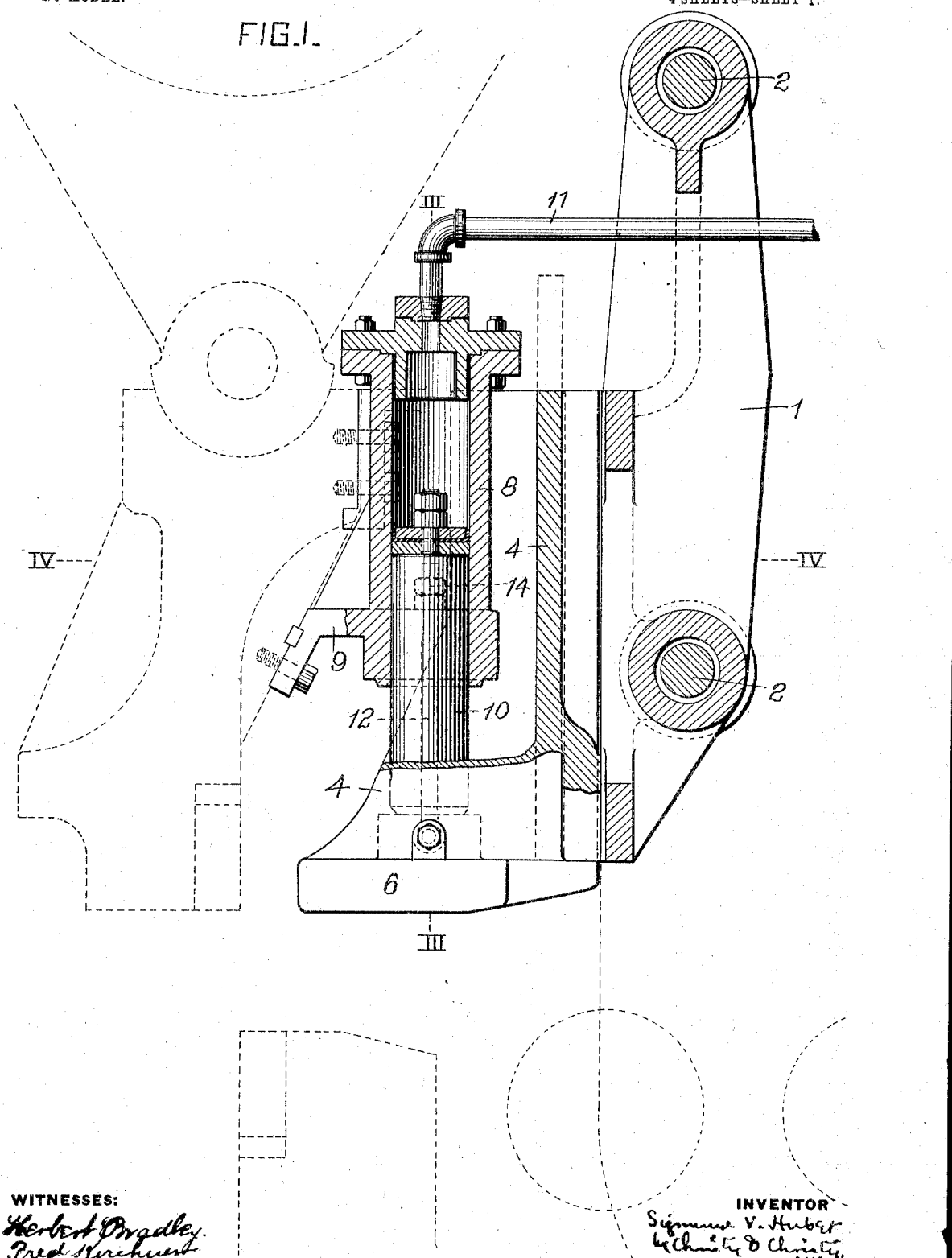

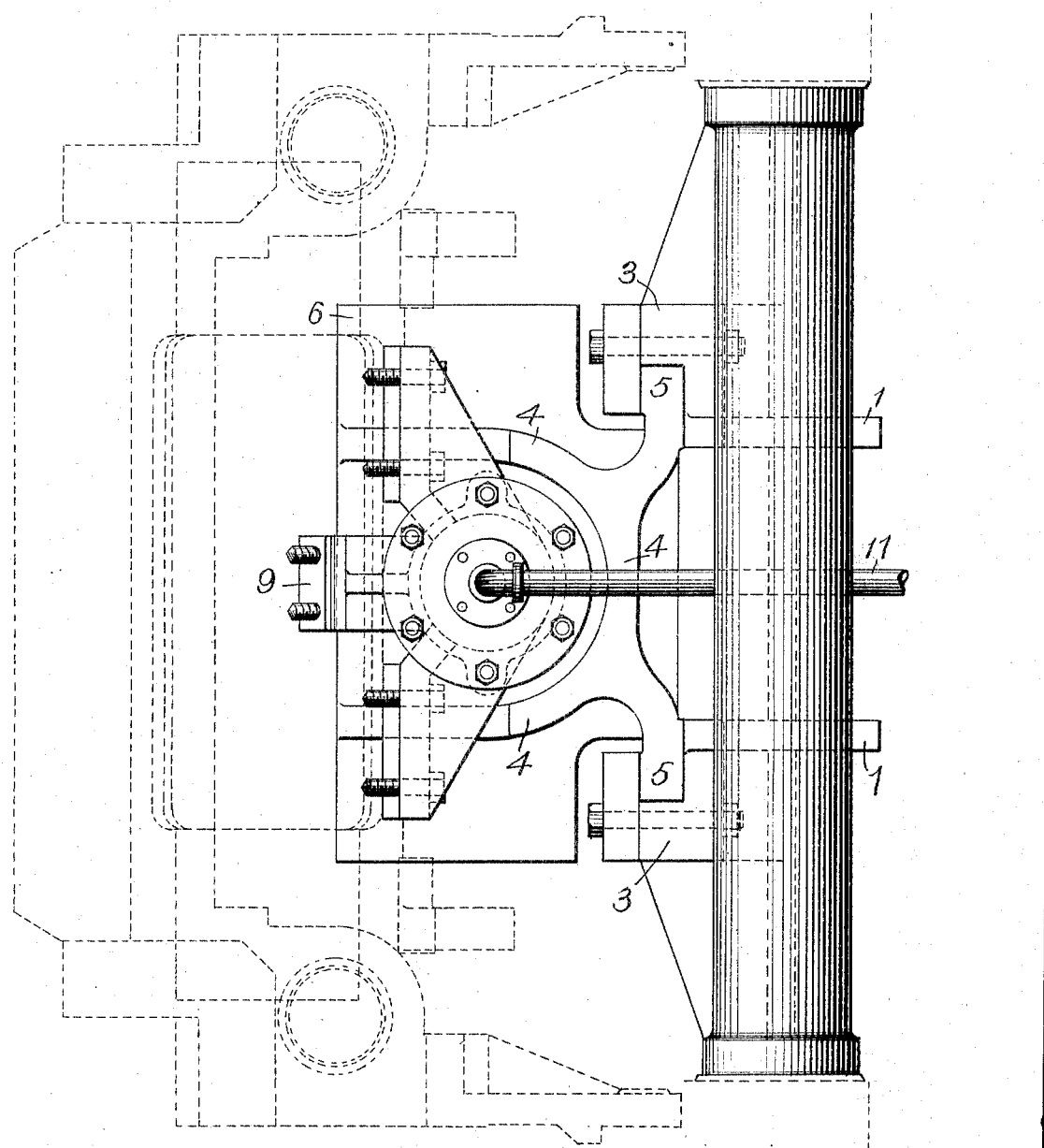

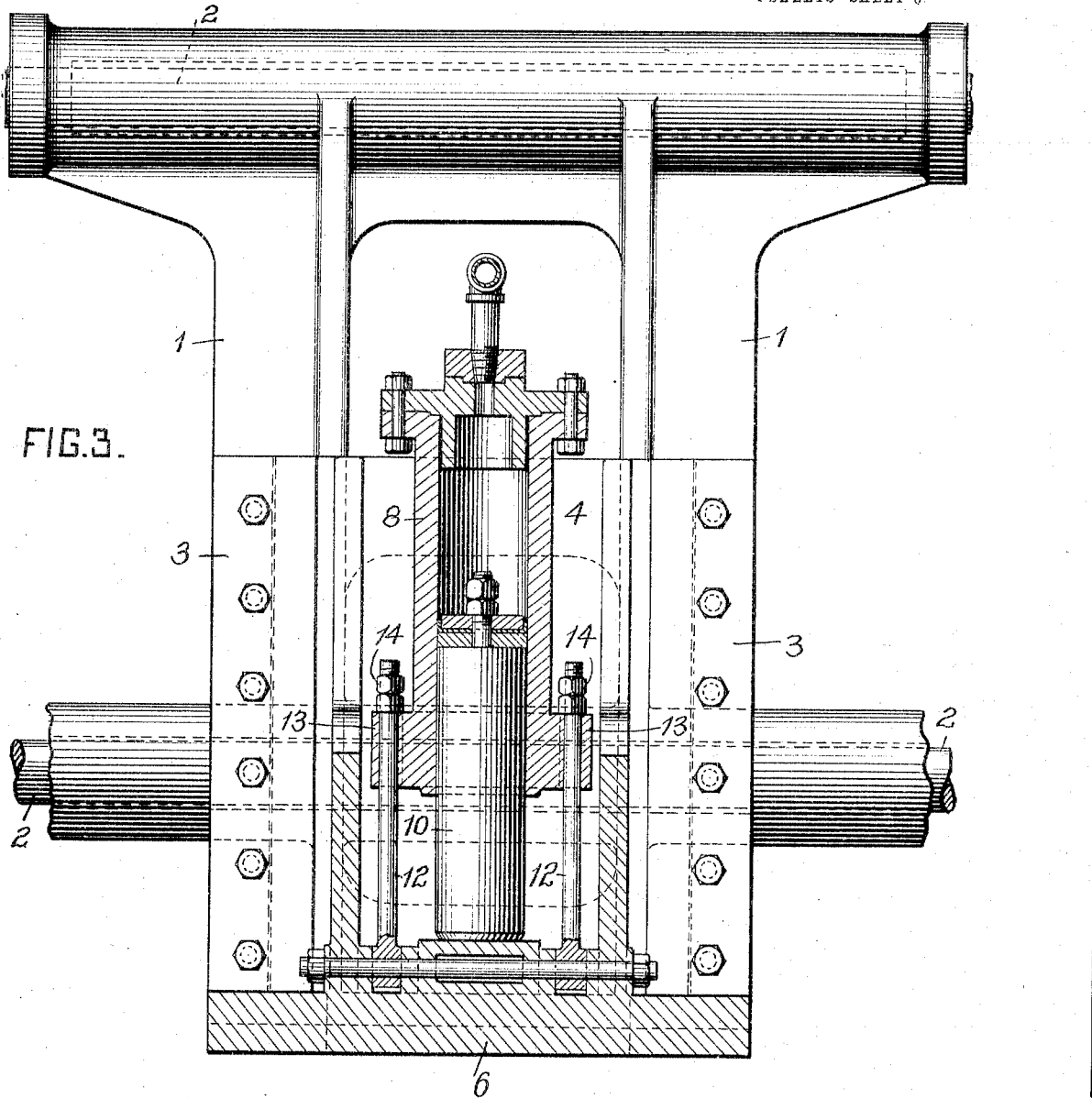

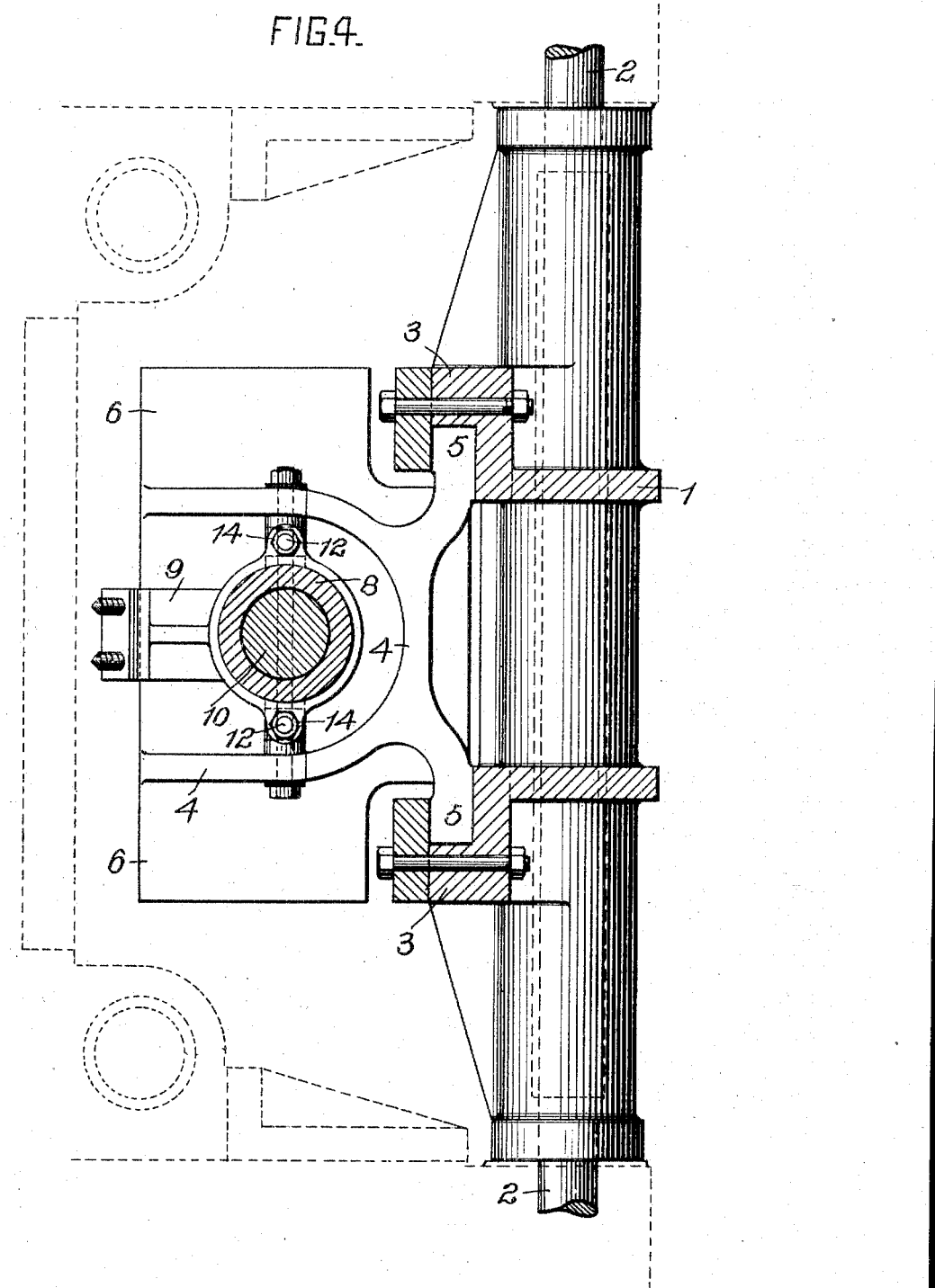

Patented December 13, 1904.

UNITED STATES PATENT OFFICE.

SIGMUND V. HUBER, OF PITTSBURG, PENNSYLVANIA.

SHEAR MECHANISM.

SPECIFICATION forming part of Letters Patent No. 777,257, dated December 13, 1904.

Application filed January 7, 1904. Serial No. 188,151. (No model.)

*To all whom it may concern:*

Be it known that I, SIGMUND V. HUBER, a citizen of the United States, residing at Pittsburg, in the county of Allegheny and State of Pennsylvania, have invented or discovered certain new and useful Improvements in Shear Mechanism, of which improvements the following is a specification.

The invention described herein relates to certain improvements in gags for shears, and has for its object a construction wherein the gag mechanism is carried by the upper head of the shears and is automatically operative during the shearing operation to hold the article being sheared firmly and with a yielding pressure against the stationary or lower jaw.

The invention is hereinafter more fully described and claimed.

In the accompanying drawings, forming a part of this specification, Figure 1 is a sectional elevation of the gag mechanism, portions of the shearing mechanism being shown in outline. Fig. 2 is a top plan view of the same. Fig. 3 is a sectional elevation on a plane indicated by the line III III, Fig. 1; and Fig. 4 is a sectional plan view on a plane indicated by the line IV IV, Fig. 1.

In the practice of my invention I provide a guiding-plate 1, which is secured on cross-shafts 2 of the shear-frame and is provided with suitable guideways 3 for the movable block or carriage 4. As shown in Figs. 1 and 2, this carriage is provided with wings 5, projecting into the guideways 3, and has at its lower end a holding or pressing head 6. A fluid-pressure cylinder 8 is secured to the upper or movable head of the shear, being provided with brackets 9 for that purpose. The piston 10 within the cylinder bears at its lower end against a block or boss on the head 6 and is continually forced downwardly by fluid-pressure admitted to the upper end of the cylinder through the pipe 11. The downward movement of the carriage or frame and head relatively to the cylinder or the upper shear-head is limited by means of rods 12, loosely connected to the frame and passing up through wings 13 on the cylinder. The upper ends of these rods are provided with stops or shoulders 14 to limit their downward movement, such stops or shoulders being preferably made in the form of nuts screwed onto the rods.

It is characteristic of my improvement that as the shear-head moves down the holding-head moves down with it until it bears upon the piece to be sheared. The further movement of the shear-head to effect the shearing of the article will carry the cylinder down over the piston, which is yieldingly held from further movement by the article being sheared. The amount of pressure exerted by the holding-head on the article will be regulated by the fluid-pressure admitted to the cylinder above the piston.

I claim herein as my invention—

1. A shear mechanism having in combination a movable shear-head, a movable holding-head, a fluid-pressure cylinder and piston, one of said parts being secured to the shear-head and the other to the holding-head, substantially as set forth.

2. A shear mechanism having in combination a movable shear-head, a movable holding-head, a fluid-pressure cylinder secured to the shear-head, a piston bearing against the holding-head and adjustable connections from the cylinder to the holding-head to limit the downward movement of the latter, substantially as set forth.

In testimony whereof I have hereunto set my hand.

SIGMUND V. HUBER.

Witnesses:
DARWIN S. WOLCOTT,
F. E. GAITHER.